United States Patent
Taguchi

(10) Patent No.: US 7,501,940 B2
(45) Date of Patent: Mar. 10, 2009

(54) DEVICE FOR DISPLAYING FUEL EFFICIENCY DEGRADATION AMOUNT BASED ON TIRE AIR PRESSURE

(75) Inventor: Akihiro Taguchi, Obu (JP)

(73) Assignee: DENSO Corporation, Kariya (JP)

( * ) Notice: Subject to any disclaimer, the term of this patent is extended or adjusted under 35 U.S.C. 154(b) by 310 days.

(21) Appl. No.: 11/329,108

(22) Filed: Jan. 11, 2006

(65) Prior Publication Data
US 2006/0202811 A1 Sep. 14, 2006

(30) Foreign Application Priority Data
Feb. 25, 2005 (JP) ............................. 2005-050646

(51) Int. Cl.
*B60C 23/00* (2006.01)
(52) U.S. Cl. ....................... 340/442; 701/123
(58) Field of Classification Search ............. 340/442, 340/443, 444, 445, 447, 449, 436, 870.03, 340/870.05, 870.06, 517, 518, 520, 521, 340/522, 525, 526, 539.1, 539.16, 539.22, 340/539.24, 539.26, 539.27, 539.28, 665, 340/666, 438, 439, 450, 450.2; 701/123, 701/124, 129, 29, 104, 24, 30, 33
See application file for complete search history.

(56) References Cited

U.S. PATENT DOCUMENTS

| | | | | |
|---|---|---|---|---|
| 6,092,021 A | * | 7/2000 | Ehlbeck et al. | ............. 701/123 |
| 6,594,579 B1 | * | 7/2003 | Lowrey et al. | ............. 701/123 |
| 6,731,205 B2 | * | 5/2004 | Schofield et al. | ............. 340/444 |
| 7,132,938 B2 | * | 11/2006 | Suzuki | ............. 340/442 |
| 2003/0191566 A1 | * | 10/2003 | Ben-Assa | ............. 701/29 |
| 2004/0055370 A1 | | 3/2004 | Normann et al. | |
| 2005/0099281 A1 | | 5/2005 | Suzuki | |
| 2007/0143002 A1 | * | 6/2007 | Crowell et al. | ............. 701/123 |

FOREIGN PATENT DOCUMENTS

JP 2003-166868 6/2003

* cited by examiner

*Primary Examiner*—Angela Ortiz
*Assistant Examiner*—John F Mortell
(74) *Attorney, Agent, or Firm*—Nixon & Vanderhye P.C.

(57) ABSTRACT

A fuel efficiency degradation amount displaying device detects a tire air pressure and calculates an amount of degradation of fuel efficiency of the vehicle compared to fuel efficiency in a case that the tire air pressure is appropriate. Then the fuel efficiency degradation amount displaying device indicates not only a warning of the decrease of the tire air pressure but also the amount of the fuel efficiency degradation. Therefore the driver can recognize the amount of the degradation clearly and intuitively. As a result, it is possible to prevent drivability of the vehicle from getting worse, because the driver can adjust, knowing a relation between the tire air pressure and the fuel efficiency, the tire air pressure to the appropriate tire air pressure.

2 Claims, 4 Drawing Sheets

DEVICE FOR DISPLAYING FUEL EFFICIENCY DEGRADATION AMOUNT BASED ON TIRE AIR PRESSURE

CROSS REFERENCE TO RELATED APPLICATION

This application is based on and incorporates herein by reference Japanese patent application No. 2005-50646 filed on Feb. 25, 2005.

FIELD OF THE INVENTION

The present invention relates to a fuel efficiency degradation amount displaying device for detecting a tire air pressure of a vehicle and displaying based on the detected pressure an amount of degradation of fuel efficiency of a vehicle.

BACKGROUND OF THE INVENTION

Recently, a lot of vehicles include a tire air pressure detecting device e.g., US 2004/0055370A1 (JP 2003-528378A) for giving a warning on detecting decrease of a tire air pressure. In general, the tire air pressure detecting device turns on a warning light provided at an instrument panel in a passenger compartment in giving the warning. In this case, a value indicating the tire air pressure may also be displayed.

However, a driver knows little about implications of the tire air pressure. For instance, it is hardly known that the tire air pressure decreases naturally and gradually, specifically by about 20 kPa per month. It is hardly known as well that decrease of the tire air pressure has negative influence on drivability, fuel efficiency, and so on.

Therefore, the driver tends to ignore the warning given by the tire air pressure detecting device because of lack of knowledge about the negative influence. The driver tends to think that the warning is a consequence of malfunction of the tire air pressure detecting device because he/she understands erroneously that the warning light is turned on while a tire in concern is not in a bad condition.

SUMMARY OF THE INVENTION

It is therefore an object of the present invention to help a driver of a vehicle understand implications of decrease of a tire air pressure.

A fuel efficiency degradation amount displaying device of the present invention includes: a tire air pressure detecting unit for outputting a detection signal depending on a tire air pressure of a wheel attached to a vehicle; a fuel efficiency degradation amount specifying unit for specifying based on the outputted detection signal an amount of degradation of fuel efficiency of the vehicle compared to fuel efficiency of the vehicle in a case that the tire air pressure is appropriate; and a displaying unit for displaying the specified amount of the degradation.

Thus, the fuel efficiency degradation amount displaying device is capable of displaying the amount of the degradation of the fuel efficiency. Therefore, a driver of the vehicle can recognize the amount of the degradation clearly and intuitively. As a result, it is possible to prevent drivability of the vehicle from getting worse, because the driver can adjust, knowing a relation between the tire air pressure and the fuel efficiency, the tire air pressure to the appropriate tire air pressure.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Hereafter, a fuel efficiency degradation amount displaying device (hereafter also referred to simply as a displaying device) according to an embodiment of the present invention is described with reference to FIGS. 1-5. The upward direction and the downward direction in FIG. 1 correspond to the frontward direction and the backward direction of a vehicle 1.

Figure 1:
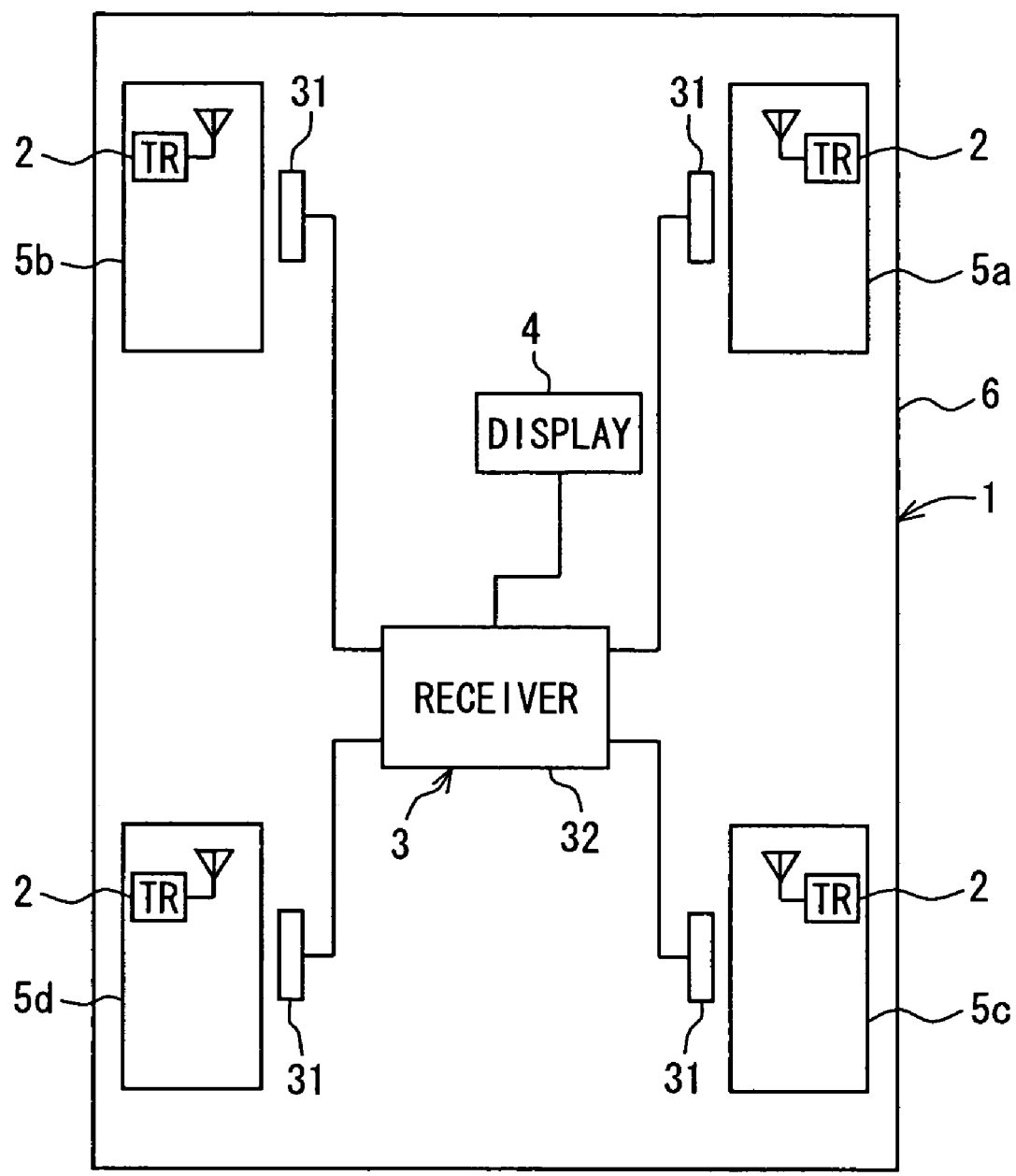
FIG. 1 is a block diagram showing a fuel efficiency degradation amount displaying device according to an embodiment of the present invention.

As shown in FIG. 1, the displaying device is mounted on the vehicle 1 and includes transmitters 2, a receiver 3, and a displaying unit 4.

The transmitters 2 are provided at wheels 5a-5d, respectively. Each of the transmitters 2 detects an air pressure of a tire in a corresponding wheel 5a-5d, puts data indicating the detected tire air pressure into a transmission frame and transmits the transmission frame as a detection signal.

The receiver 3, which is provided in a body 6 of the vehicle 1, receives the transmission frames from the transmitters 2 and specifies tire air pressures of the wheels 5a-5d by executing processes and calculations based on the data indicating the tire air pressures in the transmission frames.

Figure 2A:
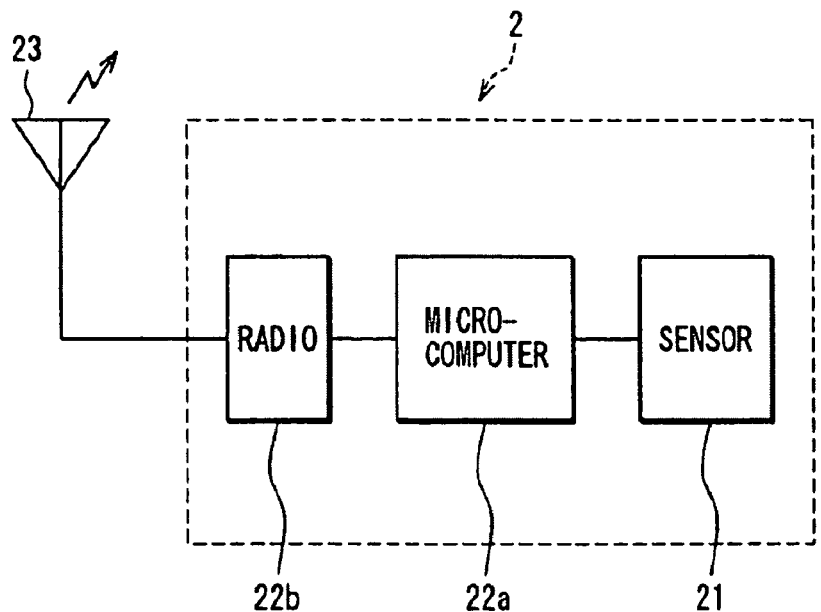
FIG. 2A is a block diagram showing a transmitter in the fuel efficiency degradation amount displaying device.

As shown in FIG. 2A, each of the transmitters 2 includes a sensing unit 21, a microcomputer 22a, and a radio unit 22b, and an antenna 23.

The sensing unit 21 includes a pressure sensor (e.g. a diaphragm type pressure sensor) and a temperature sensor and outputs a detection signal depending on the tire air pressure detected by the pressure sensor and a detection signal depending on a tire air temperature detected by the temperature sensor.

The microcomputer 22a, which is well-known, includes a CPU, a ROM, a RAM, and an I/O. The microcomputer 22a executes predetermined processes based on a program in the ROM.

Specifically, the microcomputer 22a receives the detection signals from the sensing unit 21, processes the detection signals according to need, puts detection data indicating detected physical quantities (e.g. the tire air pressure, the tire air temperature) into the transmission frame, and outputs the transmission frame to the radio unit 22b. The operation of the microcomputer 22a for outputting the transmission frame is made periodically according to the program.

The radio unit 22b is operated as an outputting unit for transmitting, by means of the antenna 23, the transmission frame received from the microcomputer 22a.

Each of the transmitters 2 is attached to an air injection valve of the corresponding wheel 5a-5d, with the sensing unit 21 exposed to an interior of the tire in the corresponding wheel 5a-5d. Thus, each of the transmitters 2 transmits through the antenna 23 the transmission frame at a predetermined interval (e.g. one minute).

Figure 2B:
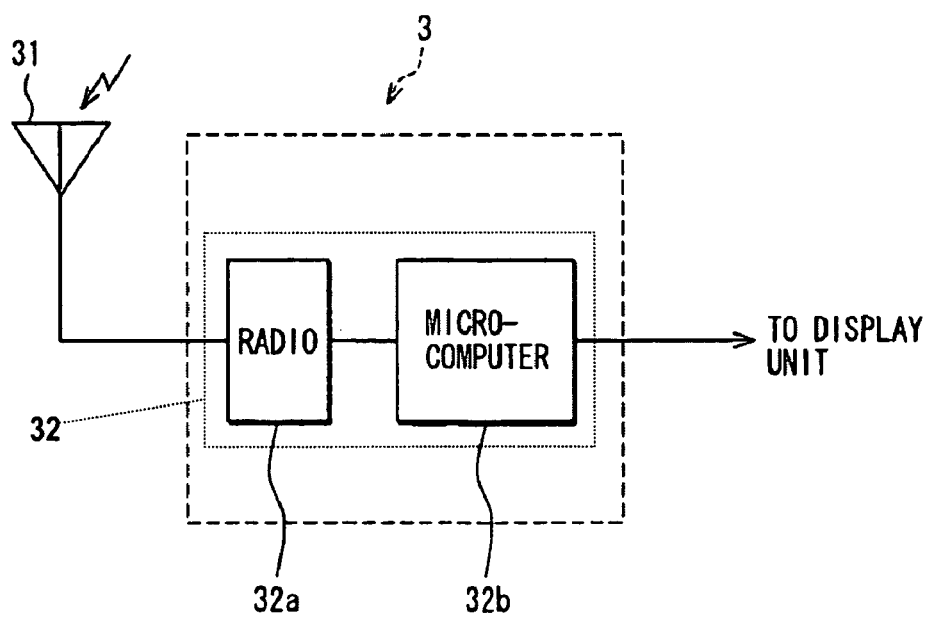
FIG. 2B is a block diagram showing a receiver in the fuel efficiency degradation amount displaying device.
Figure 3:
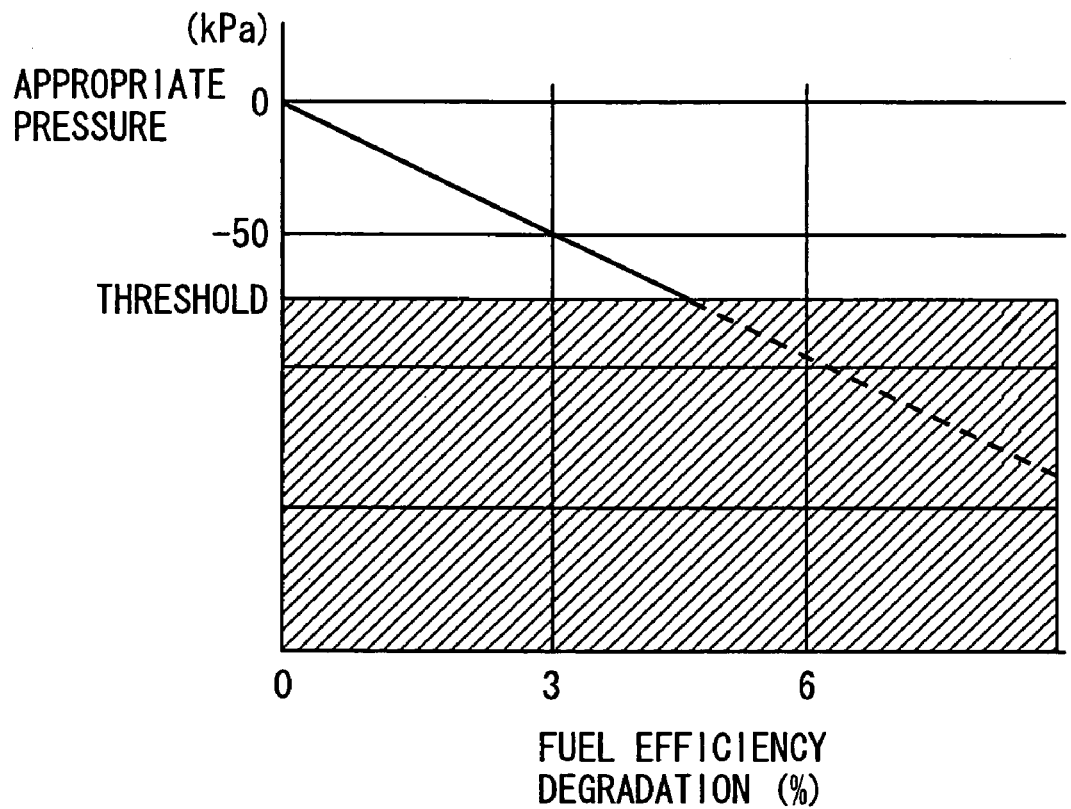
FIG. 3 is a map showing a relation between a tire air pressure and an amount of fuel efficiency degradation.

As shown in FIG. 2B, the receiver 3 includes antennas 31, and an electronic circuit 32 (also illustrated in FIG. 1) including a radio unit 32a and a microcomputer 32b.

The number of the antennas 31 included by the receiver 3 corresponds to (e.g. as many as, multiple times as many as) the number of the wheels 5a-5d (or the number of the transmitters 2). The antennas 31 are located at corresponding positions to the transmitters 2, that is, located with a predetermined interval to the respective transmitters 2.

The radio unit 32a is operated as an inputting unit which receives, through the antennas 31, the transmission frames transmitted by the transmitters 2, and outputs the transmission frames to the microcomputer 32b.

The microcomputer 32b, which is well-known, includes a CPU, a ROM, a RAM, and an I/O. The microcomputer 32b executes predetermined processes based on a program in the ROM.

Specifically, the microcomputer 32b executes, based on the detection data in each of the received transmission frames, processes and calculations to specify the tire air pressure and outputs to the displaying unit 4 an electric signal depending on the specified pressure.

More specifically, the microcomputer 32b makes a determination whether the specified tire air pressure is within a low pressure emergency range by determining whether the specified tire air pressure is below a predetermined threshold Th. If the determination is affirmative, the microcomputer 32b outputs to the displaying unit 4 a signal indicating the affirmative determination. Thus, the displaying unit 4 receives information indicating that a tire air pressure of one of the wheels 5a-5d has decreased.

The microcomputer 32b also specifies, according to the specified tire air pressure, a degree of shortage of the tire air pressure compared to an appropriate tire air pressure. The microcomputer 32b further specifies, according to the specified tire air pressure, an amount of degradation of fuel efficiency in the case that the vehicle travels at the specified tire air pressure, compared to fuel efficiency in the case that the vehicle travels at the appropriate tire air pressure.

The amount of the fuel efficiency degradation can be obtained according to a relation (as shown by a map in FIG. 3) between the tire air pressure and the amount of fuel efficiency degradation. According to the map in which the appropriate pressure is assumed to be 0 kPa, a decrease ratio of fuel efficiency becomes 2 to 3% when the tire air pressure is lower by 50 kPa than the appropriate tire air pressure. The microcomputer 32b obtains the amount of the fuel efficiency degradation based on the map in FIG. 3. Then, the microcomputer 32b outputs to the displaying unit 4 signals indicating the degree of the pressure shortage and the amount of the fuel efficiency degradation.

As shown in FIG. 1, the displaying unit 4 is located at a place where the driver can see it. The displaying unit 4 includes, for example, a screen such as liquid crystal in an instrument panel. When the displaying unit 4 receives from the microcomputer 32b signals indicating the decrease of the tire air pressure, the degree of the pressure shortage, and the amount of the fuel efficiency degradation, it notifies the driver of information in the received signals.

Figure 4:
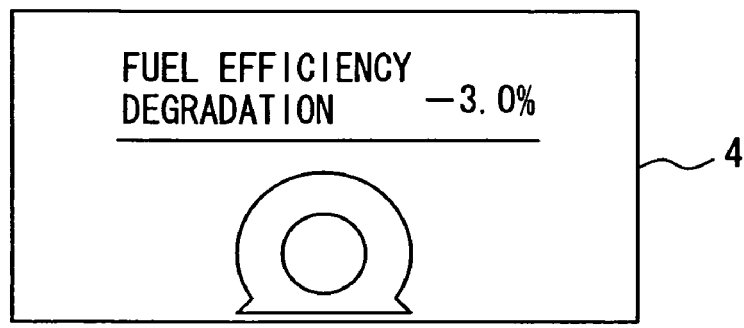
FIG. 4 is a schematic view of an image displayed by the fuel efficiency degradation amount displaying device.
Figure 5:
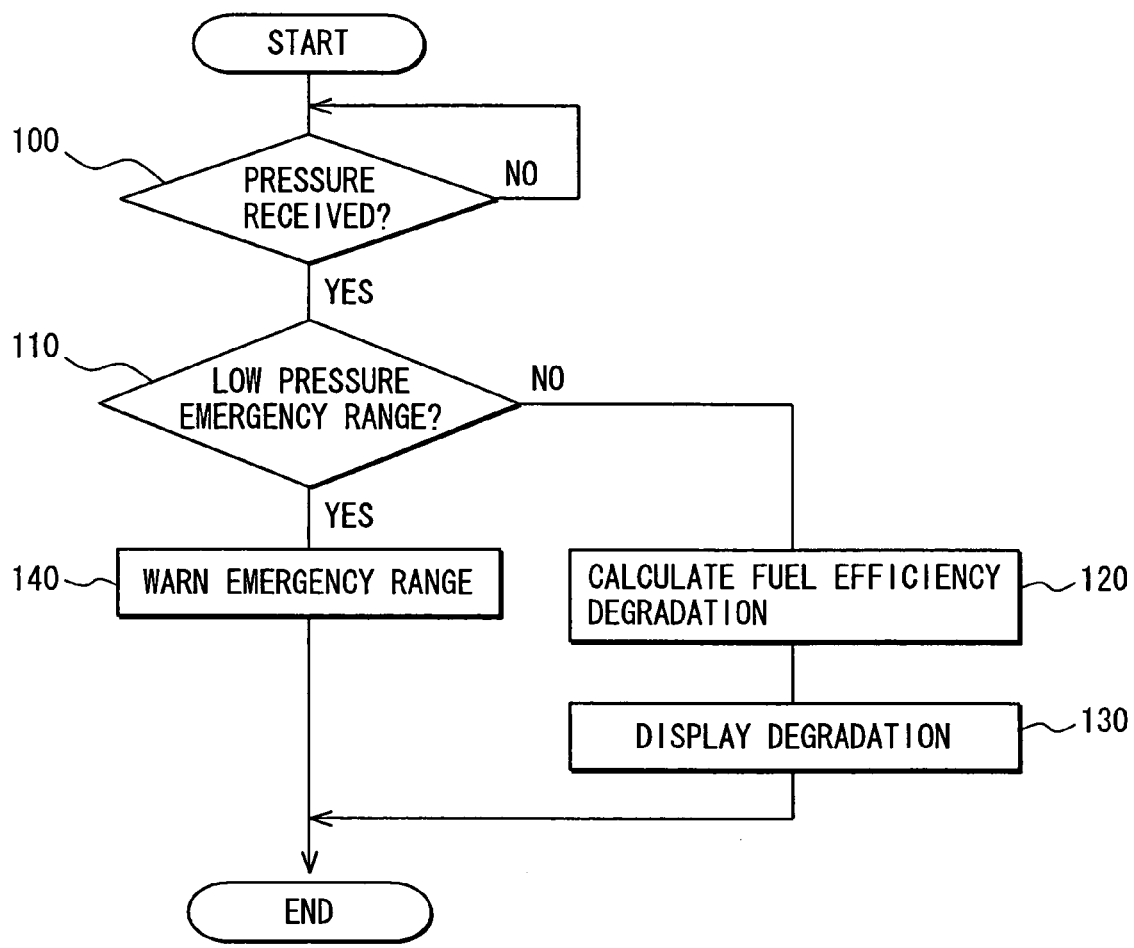
FIG. 5 is a flowchart showing a controlling process executed by the receiver.

As shown in FIG. 4, the displaying unit 4 displays together an image indicating the decrease of the tire air pressure and the amount of the fuel efficiency degradation. Therefore, the driver can recognize that the tire air pressure has decreased and that the fuel efficiency has got worse because of the decrease of the tire air pressure.

Hereafter, an operation of the fuel efficiency degradation amount displaying device is described.

In the transmitters 2, at a predetermined detection timing, the microcomputer 22a receives from the sensing unit 21 a signal indicating the tire air pressure and the tire air temperature. Then the microcomputer 22a processes the received signal according to need, puts the received signal in the transmission frame, and transmits by means of the radio unit 22b to the receiver 3.

In the receiver 3, the transmission frame is received by one of the antennas 31 and then inputted to the microcomputer 32b through the radio unit 32a. Then the microcomputer 32b extracts the detection data indicating the tire air pressure and the tire air temperature and calculates the tire air pressure by applying, if necessary, a correction to the tire air pressure based on the tire air temperature.

If the calculated tire air pressure is below the appropriate tire air pressure, the microcomputer 32b specifies the degree of the tire air pressure shortage compared to the appropriate tire air pressure and the amount of the fuel efficiency degradation. Then the microcomputer 32b outputs to the displaying unit 4 the signal indicating the specified degree of the pressure shortage and the specified amount of the fuel efficiency degradation. Thus, the displaying unit 4 displays the amount of the fuel efficiency degradation (e.g. getting worse by 3%) caused by the decrease of the tire air pressure.

If the calculated tire air pressure is within the low pressure emergency range below a predetermined threshold, the microcomputer 32b outputs to the displaying unit 4 the signal indicating that the tire air pressure is within the low pressure emergency range. Then the displaying unit 4 displays a warning of the critical decrease of the tire air pressure.

The operation described above is summarized by a flowchart shown in FIG. 4.

The microcomputer 32b makes at a step 100 a determination whether the transmission frame including the data indicating the tire air pressure is received. When the transmission frame is received, the microcomputer 32b calculates the tire air pressure and determines at a step 110 whether the calculated tire air pressure is within the low pressure emergency range.

When the microcomputer 32b determines that the calculated tire air pressure is not within the low pressure emergency range, it calculates at a step 120 the amount of fuel efficiency degradation compared to the case that the tire air pressure is appropriate and outputs at a step 130 the calculated amount to the displaying unit 4 to cause the displaying unit 4 display the calculated amount.

When the microcomputer 32b determines that the calculated tire air pressure is within the low pressure emergency range, it outputs at a step 140 to the displaying unit 4 the signal indicating that the tire air pressure is within the low pressure emergency range.

Thus, the amount of the fuel efficiency degradation caused by the tire air pressure decrease is displayed. Since the fuel efficiency degradation amount displaying device indicates not only a warning of the decrease of the tire air pressure but also the amount of the fuel efficiency degradation, the driver can recognize the amount of the degradation clearly and intuitively. As a result, it is possible to prevent drivability of the vehicle from getting worse, because the driver can adjust, knowing a relation between the tire air pressure and the fuel efficiency, the tire air pressure to the appropriate tire air pressure.

In addition, the fuel efficiency degradation amount displaying device displays the degree of the tire air pressure shortage compared to the appropriate tire air pressure. Therefore, the driver can recognize how much supplemental pressure is necessary to achieve the appropriate tire air pressure.

Other Embodiments

In the above embodiment, the tire air pressure is detected in a direct method by using the pressure sensor in the sensing unit 21. The tire air pressure, however, can be detected in a method other than the direct method.

The amount of the fuel efficiency degradation may be also displayed in the case that the calculated tire air pressure is within the low pressure emergency range. In addition, the amount of the fuel efficiency degradation may be displayed even in the case that the calculated tire air pressure is not below the appropriate pressure but has decreased to a level at which the fuel efficiency gets worse.

The displaying unit 4 may include a microcomputer in place of the microcomputer 32b of the receiver 3. In this case, the microcomputer in the displaying unit 4 may receive from the receiver 3 a signal indicating the tire air pressure, calculate according to this signal the amount of the fuel efficiency degradation, and cause the displaying unit 4 to display the calculated amount.

The amount of the fuel efficiency degradation to be displayed can be corrected depending on a ground contact pressure of the tire and a detected quantity of the tire having influence to the fuel efficiency, such as rolling resistance.

What is claimed is:

1. A fuel efficiency degradation amount displaying device, comprising:
    a tire air pressure detecting unit for outputting a detection signal depending on a tire air pressure of a wheel attached to a vehicle;
    a fuel efficiency degradation amount specifying unit for specifying based on the outputted detection signal an amount of degradation of fuel efficiency of the vehicle compared to fuel efficiency of the vehicle in a case that the tire air pressure is appropriate;
    a displaying unit for displaying the specified amount of the degradation; and
    a low tire air pressure determination unit for making, based on the outputted detection signal, a determination whether the tire air pressure is below a predetermined threshold,
    wherein the displaying unit displays, based on the determination being affirmative, information indicating decrease of the tire air pressure;
    the fuel efficiency degradation amount determining unit specifies, based on the determination being negative, the amount of degradation of fuel efficiency; and
    the displaying unit changes the display thereof from the amount of degradation of fuel efficiency to the information indicating decrease of the tire pressure when the determination is changed from negative to affirmative.

2. The fuel efficiency degradation amount displaying device according to claim 1, further comprising: a pressure shortage detecting unit for detecting, based on the outputted detection signal, a degree of shortage of the tire air pressure compared to an appropriate tire air pressure, wherein the displaying unit displays the detected degree of the shortage of the tire air pressure.

* * * * *